J. MOTT.
Side-Hill Plow.
No 54,756. Patented May 15, 1866.
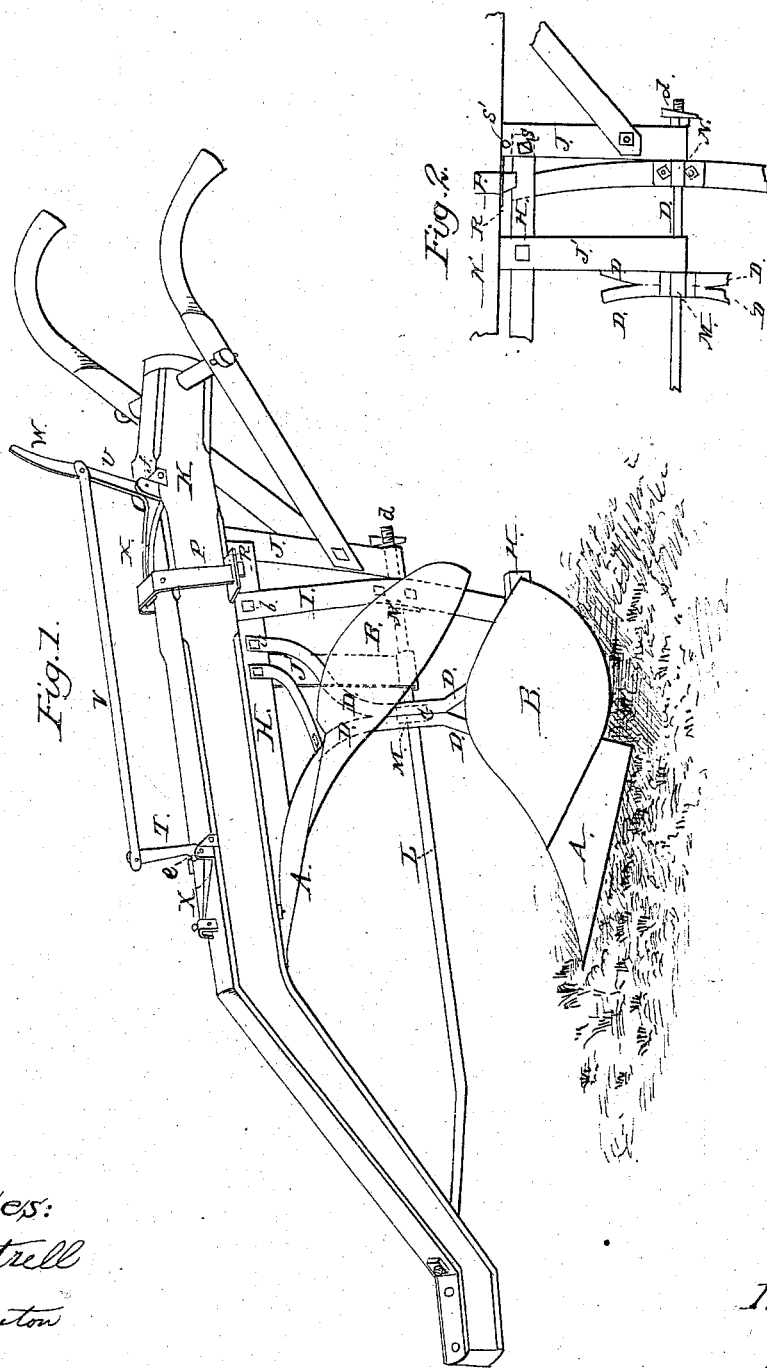
Witnesses:
Jas W Cottrell
C. W. Boynton
Inventor:
John Mott

UNITED STATES PATENT OFFICE.

JOHN MOTT, OF DANVILLE, CALIFORNIA.

IMPROVEMENT IN PLOWS.

Specification forming part of Letters Patent No. 54,756, dated May 15, 1866.

*To all whom it may concern:*

Be it known that I, JOHN MOTT, of Danville, county of Contra Costa, State of California, have invented a new and Improved Double Revolving Plow, called "Mott's Double Revolving Plow;" and I do hereby declare that the following is a full, clear, and exact description of the construction and operation of the same, reference being had to the accompanying drawings, making part of this specification, in which—

Figure 1 is a perspective view of the entire machine; Fig. 2, a view of the attachment of clasps M and N.

The nature of my invention relates to the employment or use of two plows revolving upon a central horizontal axis, with arrangements for securing the same in such a manner that in plowing the furrow may be turned in either direction at pleasure.

In the drawings, A A are the plowshares; B B, mold-boards; C, front standard of the plows, the latter divided into four prongs, D D D D, the two rear prongs being fastened, by bolts $a$ $a$, to the landsides H H.

The rear standard, I, is secured to the landsides H H by bolts $b$ $b$.

Standards J J', secured to the plow-beam K, are formed into eyes at their lower ends to receive the rod L, which is attached by bolts at the front end of the beam and secured by nut and key $d$ behind the rear standard, J.

Clasps M and N are attached by bolts to the standards C and I around the rod L, thus bringing the double plow in the center and allowing it to revolve on the rod L.

By placing washers of different thicknesses between the clasp N and standard I, to which it is attached, the plow may be turned more or less to land.

At the rear end of the landsides are set-screws $s$ $s'$, which press against the rear standard, J, to steady the plow when in use and to keep off the landside a distance corresponding to the thickness of washers behind the clasp N; or the set-screws may be placed at the upper end of the beam-standard J, to operate against the landsides for the same purpose.

The plows are secured for use by a forward catch, O, and rear catch, P. The former passing through mortise in the beam clasps the landside. The latter clasps the plow-beam, and passing through the slotted plate R, drops over the landside. These catches are raised by bent levers T and U, hinged, respectively, at $e$ and $f$.

The levers are connected by a rod, V, and the lever U has a handle, W, for raising the catches, which are kept clasped when in use by springs X X.

For the construction of my machine the moldings of common plows may be used, attached as above described; yet I prefer to construct the mold-boards, shares, and landsides of wrought-iron, as this seems to me to be stronger and more durable, especially when used for plowing greensward or adobe lands.

By the use of my double revolving plow it is intended to greatly facilitate the plowing of hillsides, as well as gardens and other pieces of land where no dead furrows are desired.

In its operation, when the end of the furrow is attained, by a touch of the lever W the plow falls upon its side, and by turning the animals attached to the machine the share is caught by its point, carrying the other plow, which has been in use, up to the beam, where it is locked and is ready for service, as before described.

Having thus described my double revolving plow, I now proceed to state what I claim and desire to secure by Letters Patent—that is to say—

1. As a new invention, the use of a double plow revolving upon a horizontal axis, L, the two plows being placed one over the other in an inverted position, substantially as described, and for the purposes set forth.

2. The clasps M and N, for hinging the main rod L to the standards C and I, and the adjustment, with washers or their equivalents, of the clasp N, for turning the plow more or less to land, substantially as described.

3. The set-screws $s$ and $s'$, placed in the upper end of the standard of the plows for steadying them and keeping off the landside from the standard J', substantially as described.

In witness whereof I have hereunto set my hand and seal this 4th day of December, A. D. 1865.

JOHN MOTT. [L. S.]

Witnesses:
JOS. MOSHEIMER,
C. W. M. SMITH.